(12) United States Patent
Kishihara et al.

(10) Patent No.: US 11,131,356 B2
(45) Date of Patent: Sep. 28, 2021

(54) COIL SPRING

(71) Applicants: Suncall Corporation, Kyoto (JP);
Toyota Jidosha Kabushiki Kaisha,
Toyota (JP)

(72) Inventors: Ryuji Kishihara, Kyoto (JP); Seiji Okamura, Toyota (JP)

(73) Assignees: Suncall Corporation, Kyoto (JP);
Toyota Jidosha Kabushiki Kaisha,
Toyota (JP)

( * ) Notice: Subject to any disclaimer, the term of this patent is extended or adjusted under 35 U.S.C. 154(b) by 0 days.

(21) Appl. No.: 16/093,511

(22) PCT Filed: Feb. 7, 2017

(86) PCT No.: PCT/JP2017/004339
§ 371 (c)(1),
(2) Date: Oct. 12, 2018

(87) PCT Pub. No.: WO2017/179274
PCT Pub. Date: Oct. 19, 2017

(65) Prior Publication Data
US 2019/0085927 A1 Mar. 21, 2019

(30) Foreign Application Priority Data
Apr. 13, 2016 (JP) .............................. JP2016-080016

(51) Int. Cl.
*F16F 1/06* (2006.01)
*F16F 1/04* (2006.01)
(Continued)

(52) U.S. Cl.
CPC ................. *F16F 1/06* (2013.01); *B21F 3/02* (2013.01); *F16F 1/047* (2013.01); *F01L 1/462* (2013.01)

(58) Field of Classification Search
CPC ................ F16F 1/06; F01L 1/462; B21F 3/02
See application file for complete search history.

(56) References Cited

U.S. PATENT DOCUMENTS 2,260,606 A * 10/1941 Clark ........................ F16F 1/06
267/166
4,923,183 A * 5/1990 Saka ....................... F16F 1/042
267/167

(Continued)

FOREIGN PATENT DOCUMENTS

JP          S5491656 A       7/1979
JP          59062740    *    4/1984

(Continued)

OTHER PUBLICATIONS

International Preliminary Report on Patentability issued in PCT/JP2017/004339 dated Oct. 25, 2018.

(Continued)

*Primary Examiner* — Vishal R Sahni
(74) *Attorney, Agent, or Firm* — Sterne, Kessler, Goldstein & Fox P.L.L.C.

(57) ABSTRACT

In the coil spring of the present invention, a helical space defined by a space between coils has a first end region whose space is increased as it extends towards the other side in the axial direction from a first reference point where the space is zero, a reference region whose space is set at a reference value L (L>0), and a second end region whose space becomes narrow as it extends toward the other side in the axial direction and zero at a second reference point. The first end region has a first end outer part and a first end inner end. In a case where a pitch angle of the space between coils that causes the displacement of the space between coils per turn of the helical space to be L is a reference pitch angle Pa, the (Continued)

pitch angle in the first end outer part is set at Pa while the pitch angle in the first end inner part is set at Pb (Pb>Pa).

12 Claims, 9 Drawing Sheets

(51) Int. Cl.
*B21F 3/02* (2006.01)
*F01L 1/46* (2006.01)

(56) References Cited

U.S. PATENT DOCUMENTS

| | | | |
|---|---|---|---|
| 6,375,174 B2* | 4/2002 | Hasegawa | B60G 11/14 267/166 |
| 6,460,835 B1* | 10/2002 | Hamano | B60G 15/07 267/167 |
| 8,720,872 B2* | 5/2014 | DeMoss | A47C 23/04 267/103 |
| 8,939,438 B2* | 1/2015 | Kempf | F16F 1/047 267/166 |
| 2001/0035601 A1* | 11/2001 | Imaizumi | F16F 1/047 267/286 |
| 2002/0011090 A1* | 1/2002 | Hasegawa | B21F 3/10 72/138 |
| 2005/0051937 A1* | 3/2005 | Umezawa | F16F 1/126 267/179 |
| 2006/0042016 A1* | 3/2006 | Barman | A47C 23/043 5/716 |
| 2011/0169205 A1* | 7/2011 | Kempf | F16F 1/047 267/180 |

FOREIGN PATENT DOCUMENTS

| | | |
|---|---|---|
| JP | 10-184751 | 7/1998 |
| JP | 2000-205320 | 7/2000 |
| JP | 2005-016645 | 1/2005 |
| JP | 2012-211702 | 11/2012 |

OTHER PUBLICATIONS

International Search Report issued in corresponding International Application No. PCT/JP2017/004339, dated Apr. 25, 2017.
Extended European Search Report issued in International Application No. PCT/JP2017/004339, dated Oct. 16, 2019, 7 pages.

* cited by examiner

COIL SPRING

FIELD OF THE INVENTION

The present invention relates to a coil spring available for a valve spring for an internal combustion engine, a spring for a high-pressure pump, and the like.

BACKGROUND ART

A coil spring obtained by forming a spring wire into a helical shape that axially extends from one side toward the other side is widely used as a valve spring for an internal combustion engine, a spring for a high-pressure pump, and the like.

This coil spring is a component intended to axially exert elastic force when axially compressed, and is known to also produce, in addition to the elastic force in the axial direction, force (lateral force) in the direction perpendicular to the axial direction when compressed.

Desirably, production of lateral force is prevented as much as possible.

That is to say, for example, when lateral force is produced in the case of using the coil spring as a pressing member for pressing a reciprocating plunger, frictional force produced between the plunger and the guide surface where the plunger is reciprocally accommodated is increased.

An increased frictional force leads to increased wear and frictional heat due to sliding resistance to the plunger, and may result in operational problems of an apparatus such as a high-pressure pump where the plunger is used.

In this regard, the first-listed applicant of the present application has proposed a coil spring for reducing lateral force (see Patent Literature 1 cited below).

The coil spring described in Patent Literature 1 is designed such that the number of active coils between the set height and the maximum height during use is an integer, and thus the coil spring is capable of reducing lateral force compared with coil springs that do not have an integer or near-integer number of active coils.

Meanwhile, the coil spring has end coil parts located at the respective axial ends and a central coil part located between the end coil parts, and the region where there is a space between axially adjacent coils (a space between coils) corresponds to the active coil part.

Patent Literature 1 discloses the concept of designing a spring such that the number of coils in the active coil part is an integer, but does not describe a specific configuration that does not allow the number of coils in the active coil part to change during use.

PRIOR ART DOCUMENT

Patent Literature

Patent Literature 1: JP 2000-205320

DISCLOSURE OF THE INVENTION

The present invention has been conceived in view of such conventional art, and an object of the present invention is to provide a coil spring capable of preventing production of lateral force as much as possible.

In order to achieve the object, a first aspect of the present invention provides a coil spring having a spring wire formed into a helical shape axially extending from one side to the other side, wherein a helical space defined by a space between coils that are adjacent to each other in an axial direction has a first end region wherein the space between coils in the natural length state is increased from a first reference point, where the space between coils in the natural length state is zero, along the circumference of the helical space toward the other side in the axial direction, a reference region located closer to the other side in the axial direction than the first end region is, wherein the space between coils in the natural length state is at a reference value L (L>0), and a second end region located closer to the other side in the axial direction than the reference region is, wherein the space between coils is reduced along the circumference of the helical space toward the other side in the axial direction and the space between coils in the natural state is zero at a second reference point; the first end region has a first end outer part that extends from the first reference point toward the other side in the axial direction by m (0<m<1) in the number of turns of the helical space, and a first end inner part that extends from an inner end position of the first end outer part in the axial direction toward the other side in the axial direction by n (0<n<1 and (m+n)<1) in the number of turns of the helical space; and in a case where a pitch angle of the space between coils that causes the displacement of the space between coils per turn of the helical space to be L is a reference pitch angle Pa, the pitch angle of the space between coils in the first end outer part is set at Pa while the pitch angle of the space between coils in the first end inner part is set at Pb (Pb>Pa).

In the coil spring according to the first aspect of the present invention, the first end region of the helical space wherein the space between coils in the natural length state is increased from the first reference point, where the space between coils in the natural length state is zero, along the circumference of the helical space toward the other side in the axial direction, includes the first end outer part that extends from the first reference point toward the other side in the axial direction by m (0<m<1) in the number of turns of the helical space, and the first end inner part that extends from the inner end position of the first end outer part in the axial direction toward the other side in the axial direction by n (0<n<1 and (m+n)<1) in the number of turns of the helical space, and in a case where a pitch angle of the space between coils that causes the displacement of the space between coils per turn of the helical space to be L is a reference pitch angle Pa, the pitch angle in the first end outer part is set at Pa while the pitch angle in the first end inner part is set at Pb (Pb>Pa). The thus configured coil spring makes it possible to effectively prevent the space between coils from becoming zero in the first end region during compressional operation, and it is thus possible to effectively suppress production of lateral force.

Preferably, the second end region includes a second end outer part that extends from the second reference point toward one side in the axial direction by m in the number of turns of the helical space, and a second end inner part that extends from an inner end position of the second end outer part in the axial direction toward one side in the axial direction by n in the number of turns of the helical space; and the pitch angle of the space between coils in the second end outer part is set at Pa while the pitch angle of the space between coils in the second end inner part is set at Pb.

In one embodiment, the distance of space between coils at the inner end positions in the axial direction of the first and second end inner parts are set at L; and one side and the other side in the axial direction of the reference region are connected to the inner end positions in the axial direction of the first and second end inner parts, respectively.

In another embodiment, the distance of spaces between coils at the inner end positions in the axial direction of the first and second end inner parts is greater than L.

In this embodiment, the heliacal space is configured to further include a first transitional region that is positioned between the inner end position in the axial direction of the first end inner part and one side in the axial direction of the reference region, wherein the distance of space between coils is reduced from the inner end position in the axial direction of the first end inner part along the helical shape of the helical space toward the other side in the axial direction and becomes the reference value L, and a second transitional region that is positioned between the inner end position in the axial direction of the second end inner part and the other side in the axial direction of the reference region, wherein the distance of space between coils is reduced from the inner end position in the axial direction of the second end inner part along the helical shape of the helical space toward one side in the axial direction and becomes the reference value L.

A second aspect of the present invention provides a coil spring having a spring wire formed into a helical shape axially extending from one side to the other side, wherein, a helical space defined by a space between coils that are adjacent to each other in an axial direction has a first end region wherein the space between coils in the natural length state is increased from a first reference point, where the space between coils in the natural length state is zero, along the circumference of the helical space toward the other side in the axial direction, a reference region located closer to the other side in the axial direction than the first end region is, wherein the space between coils in the natural length state is at a reference value L (L>0), and a second end region located closer to the other side in the axial direction than the reference region is, wherein the space between coils is reduced along the circumference of the helical space toward the other side in the axial direction and the space between coils in the natural state is zero at a second reference point; the first end region has the number of turns of helical space less than 1; a pitch angle of the space between coils in an area of the first end region that extends from the first reference point until at least a point where the space between coils becomes L is constant; and the pitch angle of the space between coils of the first end region is greater than a reference pitch angle Pa that causes the displacement of the space between coils per turn of the helical space to be L.

In the coil spring according to the second aspect of the present invention, the first end region of the helical space wherein the space between coils in the natural length state is increased from the first reference point, where the space between coils in the natural length state is zero, along the circumference of the helical space toward the other side in the axial direction, has the number of turns of helical space less than 1, a pitch angle of the space between coils in an area of the first end region that extends from the first reference point until at least a point where the space between coils becomes L is constant, and the pitch angle of the space between coils of the first end region is greater than a reference pitch angle Pa that causes the displacement of the space between coils per turn of the helical space to be L. The thus configured coil spring makes it possible to effectively prevent the space between coils from becoming zero in the first end region during compressional operation, and it is thus possible to effectively suppress production of lateral force.

Preferably, the second end region has the number of turns of helical space less than 1, a pitch angle of the space between coils in an area of the second end region that extends from the second reference point until at least a point where the space between coils becomes L is constant, and the pitch angle of the space between coils of the second end region is greater than the reference pitch angle Pa.

In one embodiment, the distance of space between coils at the inner end positions in the axial direction of the first and second end inner parts are set at L, and one side and the other side in the axial direction of the reference region are connected to the inner end positions in the axial direction of the first and second end inner parts, respectively.

In another embodiment, the distance of spaces between coils at the inner end positions in the axial direction of the first and second end regions is greater than L.

In this embodiment, the heliacal space is configured to further include a first transitional region that is positioned between the inner end position in the axial direction of the first end region and one side in the axial direction of the reference region, wherein the distance of space between coils is reduced from the inner end position in the axial direction of the first end region along the helical shape of the helical space toward the other side in the axial direction and becomes the reference value L, and a second transitional region that is positioned between the inner end position in the axial direction of the second end region and the other side in the axial direction of the reference region, wherein the distance of space between coils is reduced from the inner end position in the axial direction of the second end region along the helical shape of the helical space toward one side in the axial direction and becomes the reference value L.

In any one of the above configurations, the coil spring according to the present invention preferably includes a first end coil part having a first bearing surface that is arranged on one side in the axial direction of the coil spring and faces one side in the axial direction of the coil spring, a second end coil part having a second bearing surface that is arranged on the other side in the axial direction of the coil spring and faces the other side in the axial direction of the coil spring, and a central coil part between the first and second end coil parts.

The first end coil part may include a first end coil part edge region that extends from a first end on one side in the longitudinal direction of the spring wire to a part forming the first reference point, and a first end coil part transitional region that extends from the first end coil edge region to the central coil part.

The first end coil part edge region is bent toward one side in the axial direction of the coil spring as compared with the first end coil part transitional region, and the first bearing surface extends from the first end coil part edge region to the first end coil part transitional region across a border between the first end coil part edge region and the first end coil part transitional region.

Preferably, the second end coil part may include a second end coil part edge region that extends from a second end on the other side in the longitudinal direction of the spring wire to a part forming the second reference point, and a second end coil part transitional region that extends from the second end coil edge region to the central coil part.

The second end coil part edge region is bent toward the other side in the axial direction of the coil spring as compared with the second end coil part transitional region, and the second bearing surface extends from the second end coil part edge region to the second end coil part transitional region across a border between the second end coil part edge region and the second end coil part transitional region.

In any one of the above configurations, preferably, the number of turns of helical space from the first reference point to the second reference point is an integral multiple.

EMBODIMENT FOR CARRYING OUT THE INVENTION

Embodiment 1

Below, one embodiment of the coil spring according to the present invention will now be described with reference to the attached drawings.

Figure 1:
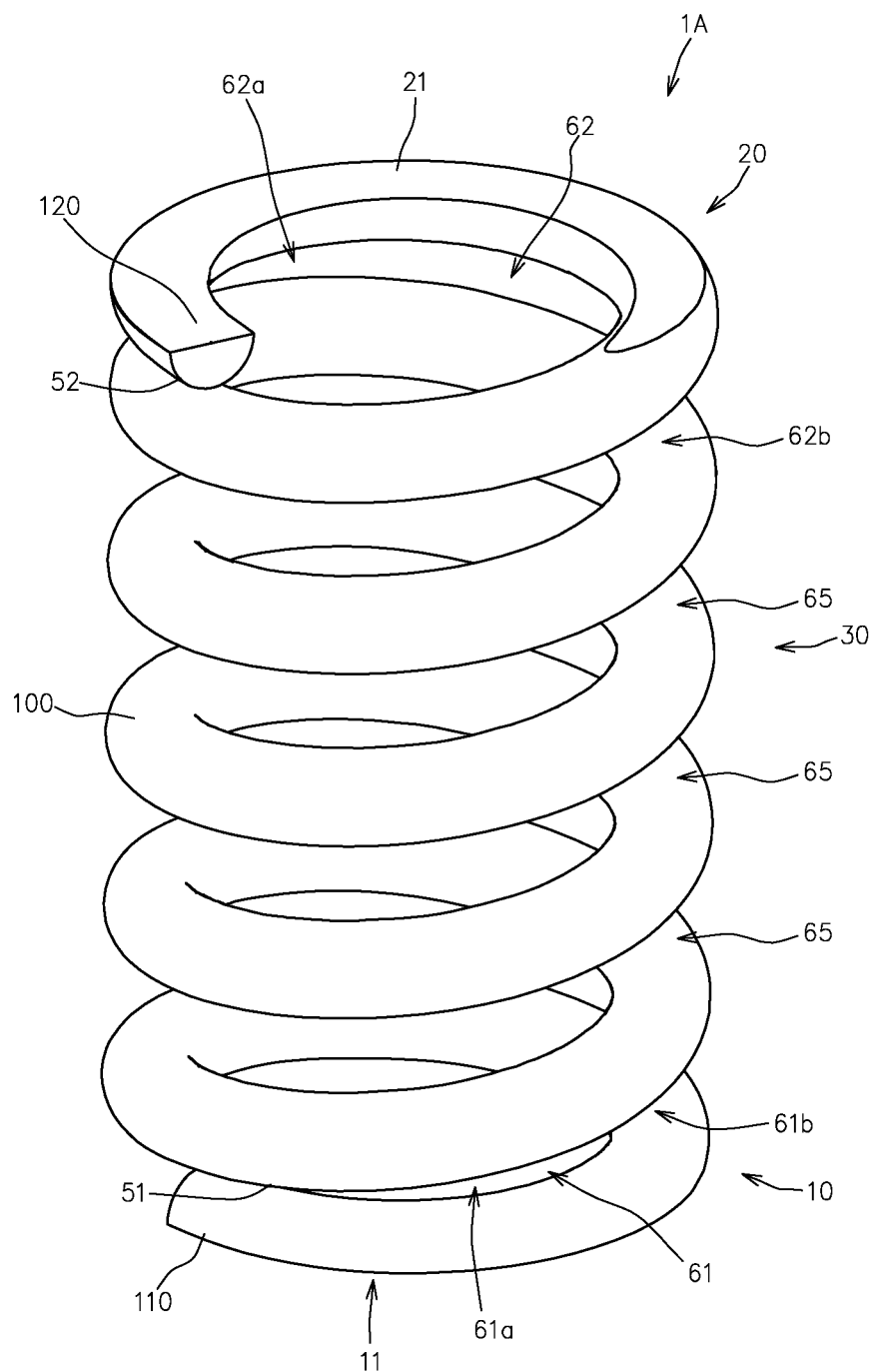
FIG. 1 is a perspective view of a coil spring according to an embodiment 1 of the present invention, showing the coil spring in a natural length state.
Figure 2:
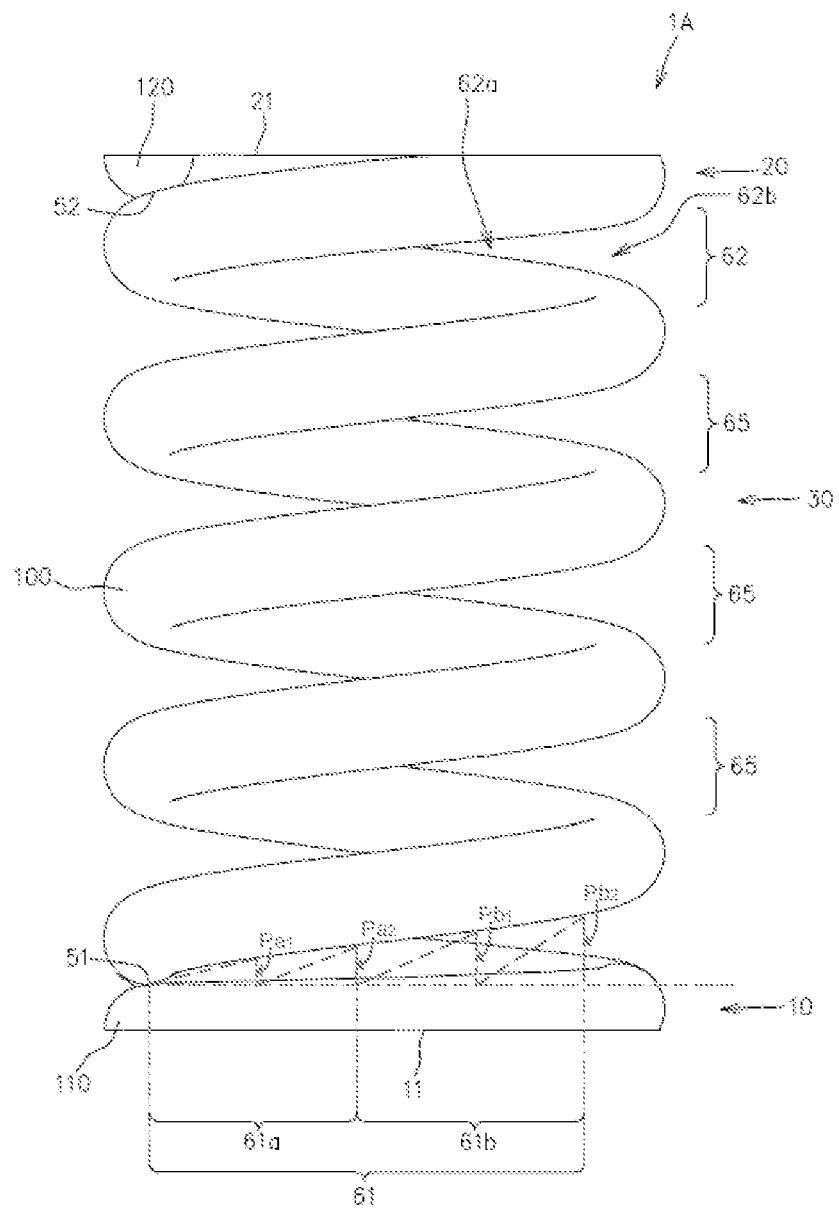
FIG. 2 is a front view of the coil spring according to the embodiment 1 in a natural length state.
Figure 3:
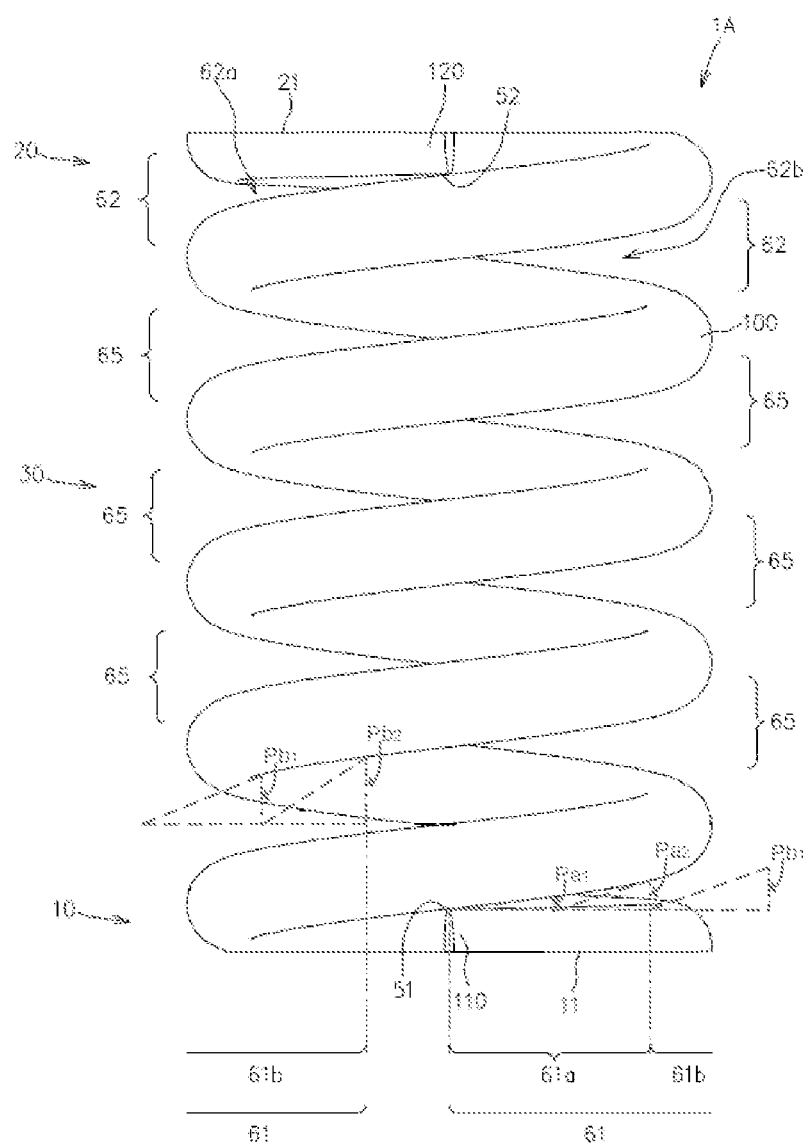
FIG. 3 a side view of the coil spring according to the embodiment 1 in a natural length state.

FIGS. 1 to 3 show a perspective view, a front view and a side view, respectively, of a coil spring 1A according to the present embodiment in a natural length state.

As shown in FIGS. 1 to 3, the coil spring 1A according to the present embodiment is obtained by forming a spring wire 100 into a helical shape axially extending from one side to the other side, and is suitably used as a valve spring for an internal combustion engine, a spring for a high-pressure pump, and the like.

In reference to the coiling of the spring wire 100, the coil spring 1A has a first end coil part 10 including a first end 110 on one side in the longitudinal direction of the spring wire 100 and having a first bearing surface 11 facing one side in the axial direction of the coil spring 1A; a second end coil part 20 including a second end 120 on the other side in the longitudinal direction of the spring wire 100 and having a second bearing surface 21 facing the other side in the axial direction of the coil spring 1A; and a central coil part 30 between the first and second end coil parts 10, 20.

In the coil spring 1A, the region where there is a space between the coils of the spring wire 100 adjacent in the axial direction of the coil spring 1A acts as an active coil part that exerts elastic force.

Hereafter, the space between the axially adjacent coils of the spring wire 100 will now be described in detail.

On one side in the axial direction, the space between coils is increased from a first reference point 51, where the space between coils in the natural length state is zero, helically toward the other side in the axial direction; in the central coil part 30, the space between coils is at a reference value L (L>0, see FIG. 3 below) that is set according to the required elastic force of the coil spring 1A; and on the other side in the axial direction, the space between coils is reduced helically toward the other side in the axial direction and is zero at a second reference point 52.

That is to say, as shown in FIGS. 2 and 3, the helical shape (hereinafter referred to as helical space) formed by the space between coils has, on one side in the axial direction, a first end region wherein the space between coils in the natural length state is increased from the first reference point 51, where the space between coils in the natural length state is zero, along the circumference of the helical space toward the other side in the axial direction; a reference region 65 located closer to the other side in the axial direction than the first end region 61 is, wherein the space between coils in the natural length state is at the reference value L; and a second end region 62 located closer to the other side in the axial direction than the reference region 65 is, wherein the space between coils is reduced along the circumference of the helical space toward the other side in the axial direction, and the space between coils in the natural state is zero at the second reference point 52.

Figure 4:
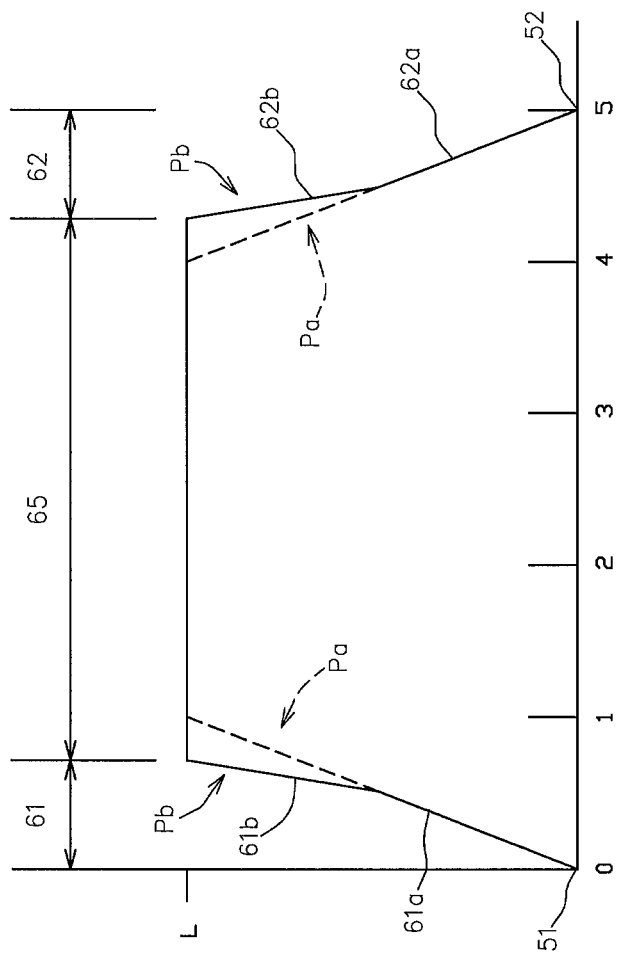
FIG. 4 is a graph showing the relationship between the number of turns of helical space and the distance of space between coils in the coil spring according to the embodiment 1.

FIG. 4 is a graph showing the relationship between the number of turns of helical space and the distance of space between coils in the coil spring 1A.

As shown in FIG. 4, in the coil spring 1A according to the present embodiment, the first end region 61 is configured such that the number of turns of the helical space is less than 1.

In detail, the first end region 61 includes a first end outer part 61a that extends from the first reference point 51 toward the other side in the axial direction by m (0<m<1) in the number of turns of the helical space, and a first end inner part 61b that extends from an inner end position of the first end outer part 61a in the axial direction toward the other side in the axial direction by n (0<n<1 and (m+n)<1) in the number of turns of the helical space.

As shown in FIG. 4, in a case where a reference pitch angle of the space between coils is Pa that causes the displacement of the space between coils per turn of the helical space to be L, the pitch angle of the space between coils in the first end outer part 61a is set at Pa while the same in the first end inner part 61b is set at Pb (Pb>Pa).

This configuration makes it possible to effectively prevent the space between coils from becoming zero in the first end region 61 when the coil spring 1A is compressed from the natural length state, and it is thus possible to effectively suppress production of lateral force during compressional operation.

That is to say, in the coil spring 1A, the first end region 61 provided on one side in the axial direction includes a part having the pitch angle of the space between coils greater than the reference pitch angle Pa of the space between coils that causes the displacement of the space between coils per turn of the helical space to be L.

Accordingly, it is possible to effectively prevent compressional operation of the coil spring 1A from resulting in a change in the number of active coils on one side in the axial direction, and it is thereby possible to effectively suppress production of lateral force during compressional operation.

In the coil spring 1A according to the present embodiment, the second end region 62 has a configuration substantially identical to the first end region 61.

That is to say, as shown in FIG. 4, the second end region 62 includes a second end outer part 62a that extends from the second reference point 52 toward one side in the axial direction by m in the number of turns of the helical space, and a second end inner part 62b that extends from an inner end position of the second end outer part 62a in the axial direction toward one side in the axial direction by n in the number of turns of the helical space.

Moreover, the pitch angle of the space between coils in the second end outer part 62a is set at the reference pitch angle Pa, while the pitch angle of the space between coils in the second end inner part 62b is set at Pb that is greater than the reference pitch angle Pa.

This configuration makes it possible to effectively prevent the space between coils from becoming zero in the second end region 62 when the coil spring 1A is compressed from the natural length state, and it is thus possible to effectively suppress production of lateral force during compressional operation.

Figure 5:
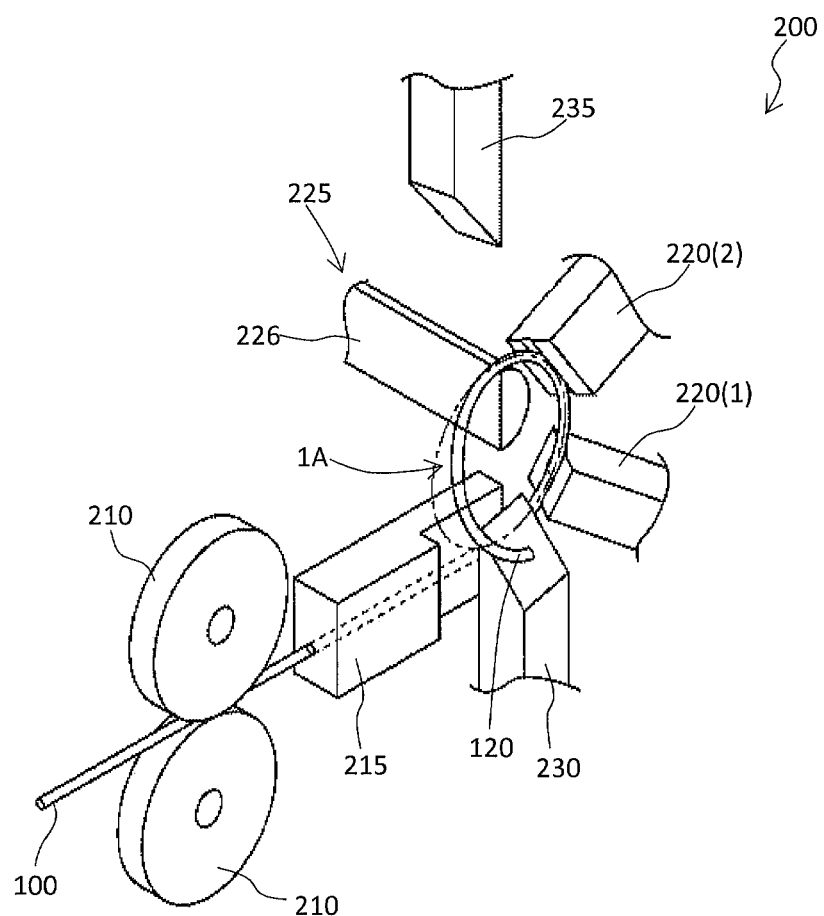
FIG. 5 is a schematic view of a manufacturing apparatus for the coil spring.

The coil spring 1A can be manufactured with, for example, a manufacturing apparatus 200 shown in FIG. 5.

As shown in FIG. 5, the manufacturing apparatus 200 has feed rollers 210 for feeding the spring wire 100; a guide member 215 for guiding the spring wire 100 conveyed by the feed rollers 210; first and second coiling tools 220(1), 220(2) provided downstream in the conveying direction of the spring wire 100 that is conveyed by the feed rollers 210 while being guided by the guide member 215, wherein the first and second coiling tools 220(1), 220(2) forming the helical coil spring 1A from the linear spring wire 100; a core metal member 225 for guiding the coil spring 1A formed into a helical shape by the first and second coiling tools 220(1), 220(2); a pitch tool 230 for adjusting the pitch of the coil spring 1A; and a cutting tool 235 for cutting the spring wire 100 in cooperation with the core metal 225.

The positions of the first and second coiling tools 220(1), 220(2) can be adjusted in the radial direction with reference to the center of the coil spring 1A to be formed, and the coil diameter of the coil spring 1A is changed in accordance with the change of the radial positions of the first and second coiling tools 220(1), 220(2).

The position of the pitch tool 230 can be adjusted in the radial direction with reference to the center of the coil spring 1A, and the pitch of the coil spring 1A is changed in accordance with the change of the radial position of the pitch tool 230.

The cutting tool 235 is radially reciprocable with reference to the center of the coil spring 1A, and is movable between a cutting position for cutting the spring wire 100 in cooperation with an engagement surface 226 of the core metal 225 and a retreated position away from the core metal 225.

As shown in FIG. 4, in the present embodiment, the spaces between coils at the inner end positions in the axial direction of the first end inner part 61b and the second end inner part 62b are set at L. One side and the other side in the axial direction of the reference region 65 are directly connected to the inner end positons in the axial direction of the first end inner part 61b and the second end inner part 62b, respectively.

This configuration facilitates the positioning control of the pitch tool 230.

Embodiment 2

Below, another embodiment of the coil spring according to the present invention will now be described with reference to the attached drawing.

Figure 6:
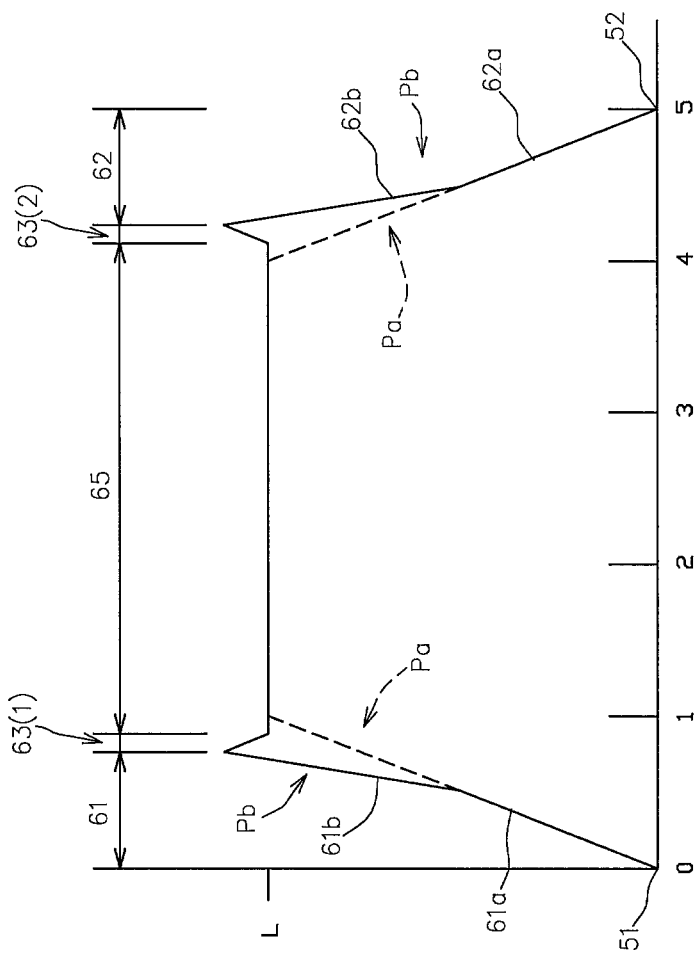
FIG. 6 is a graph showing the relationship between the number of turns of helical space and the distance of space between coils in the coil spring according to an embodiment 2 of the present invention.

FIG. 6 is a graph showing the relationship between the number of turns of helical space and the distance of space between coils in the coil spring according to the present embodiment.

In the figure, the same members as those in Embodiment 1 described above are designated by the same reference numerals and detailed descriptions thereof are omitted as appropriate.

The coil spring according to the present embodiment is mainly different from the coil spring 1a according to the embodiment 1 in that the distance of spaces between coils at the inner end positions in the axial direction of the first end inner part 61b and the second end inner part 62b is greater than L.

Along with the configuration that the distance of spaces between coils at the inner end positions in the axial direction of the first end inner part 61b and the second end inner part 62b is greater than L, in the coil spring according to the present embodiment, the heliacal space further includes a first transitional region 63(1) that is positioned between the inner end position in the axial direction of the first end inner part 61b and one side in the axial direction of the reference region 65, wherein the distance of space between coils is reduced from the inner end position in the axial direction of the first end inner part 61b along the helical shape of the helical space toward the other side in the axial direction and becomes the reference value L, and a second transitional region 63(2) that is positioned between the inner end position in the axial direction of the second end inner part 62b and the other side in the axial direction of the reference region 65, wherein the distance of space between coils is reduced from the inner end position in the axial direction of the second end inner part 62b along the helical shape of the helical space toward one side in the axial direction and becomes the reference value L.

The thus configured coil spring makes it possible to effectively prevent the space between coils from becoming zero in the first and second end regions 61, 62 during compressional operation better than the embodiment 1, and it is thus possible to more effectively suppress production of lateral force.

Embodiment 3

Below, still another embodiment of the coil spring according to the present invention will now be described with reference to the attached drawing.

Figure 7:
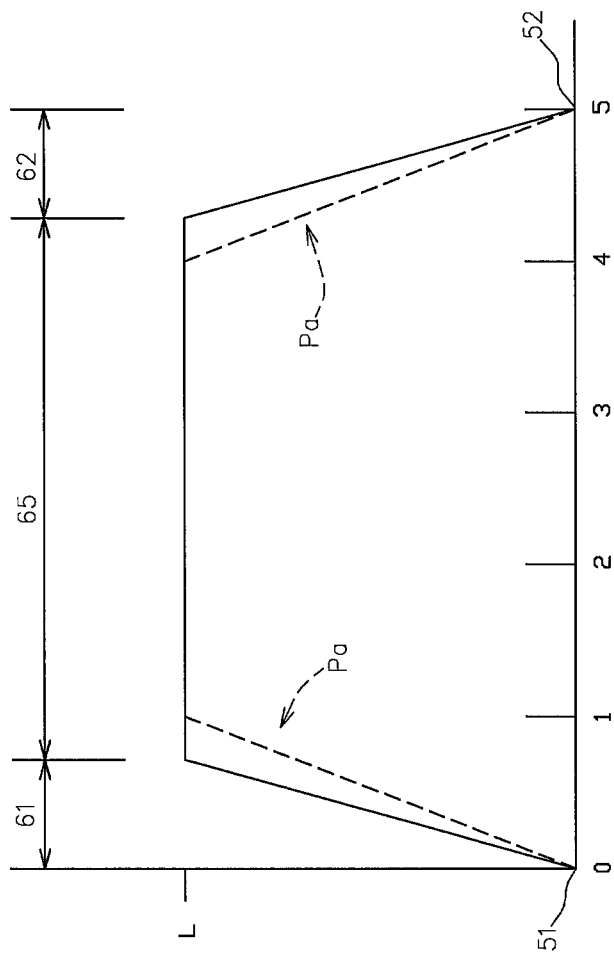
FIG. 7 is a graph showing the relationship between the number of turns of helical space and the distance of space between coils in the coil spring according to an embodiment 3 of the present invention.

FIG. 7 is a graph showing the relationship between the number of turns of helical space and the distance of space between coils in the coil spring according to the present embodiment.

In the figure, the same members as those in Embodiments 1 and 2 described above are designated by the same reference numerals and detailed descriptions thereof are omitted as appropriate.

The coil spring according to the present embodiment is mainly different from the coil springs according to the embodiments 1 and 2 in that a pitch angle of the space between coils in an area of the first end region 61 that extends from the first reference point 51 where the space between coils is zero toward the other side in the axial direction until at least a point where the space between coils becomes L is constant, and a pitch angle of the space between coils in an area of the second end region 62 that extends from the second reference point 52 where the space between coils is zero toward one side in the axial direction until at least a point where the space between coils becomes L is constant.

As shown in FIG. 7, the pitch angles of the space between coils of the first and second end regions 61, 62 are greater than the reference pitch angle Pa of the space between coils that causes the displacement of the space between coils per turn of the helical space to be L.

The thus configured coil spring makes it also possible to effectively prevent the space between coils from becoming zero in the first and second end regions 61, 62 during compressional operation, and it is thus possible to effectively suppress production of lateral force.

As shown in FIG. 7, in the present embodiment, the space between coils at the inner end positions in the axial direction of the first and second end regions 61, 62 are set at L, and one side and the other side in the axial direction of the reference region 65 are directly connected to the inner end positions in the axial direction of the first and second end regions 61, 62, respectively.

This configuration facilitates the positioning control of the pitch tool 230.

Embodiment 4

Below, still another embodiment of the coil spring according to the present invention will now be described with reference to the attached drawing.

Figure 8:
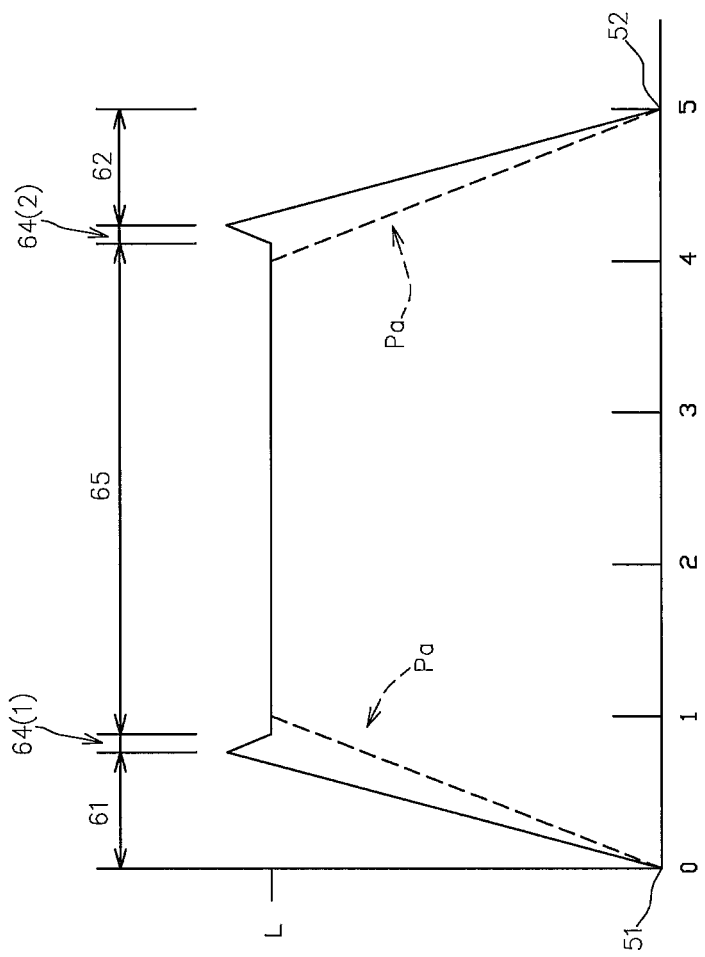
FIG. 8 is a graph showing the relationship between the number of turns of helical space and the distance of space between coils in the coil spring according to an embodiment 4 of the present invention.

FIG. 8 is a graph showing the relationship between the number of turns of helical space and the distance of space between coils in the coil spring according to the present embodiment.

In the figure, the same members as those in Embodiments 1 to 3 described above are designated by the same reference numerals and detailed descriptions thereof are omitted as appropriate.

The coil spring according to the present embodiment is mainly different from the coil spring according to the embodiment 3 in that the distance of spaces between coils at the inner end positions in the axial direction of the first and second end regions 61, 62 is greater than L.

Along with the configuration that the distance of spaces between coils at the inner end positions in the axial direction of the first and second end regions 61, 62 is greater than L, in the coil spring according to the present embodiment, the heliacal space further includes a first transitional region 64(1) that is positioned between the inner end position in the axial direction of the first end region 61 and one side in the axial direction of the reference region 65, wherein the distance of space between coils is reduced from the inner end position in the axial direction of the first end region 61 along the helical shape of the helical space toward the other side in the axial direction and becomes the reference value L, and a second transitional region 64(2) that is positioned between the inner end position in the axial direction of the second end region 62 and the other side in the axial direction of the reference region 65, wherein the distance of space between coils is reduced from the inner end position in the axial direction of the second end region 62 along the helical shape of the helical space toward one side in the axial direction and becomes the reference value L.

The thus configured coil spring makes it possible to effectively prevent the space between coils from becoming zero in the first and second end regions 61, 62 during compressional operation better than the embodiment 3, and it is thus possible to more effectively suppress production of lateral force.

In each of the embodiments, the coil spring is preferably configured such that the number of turns of helical space from the first reference point 51 to the second reference point 52 is an integral multiple.

That is to say, the coil spring is configured such that the first reference point 51 and the second reference point 52 are located in the same positions along the circumference of the helical space.

This configuration makes it possible to more effectively prevent production of lateral force during compressional operation.

In each of the embodiments, preferably, a region of the first end coil part 10, which is located closer to the end side than the first reference point 51 is, can be bent toward one side in the axial direction.

Figure 9:
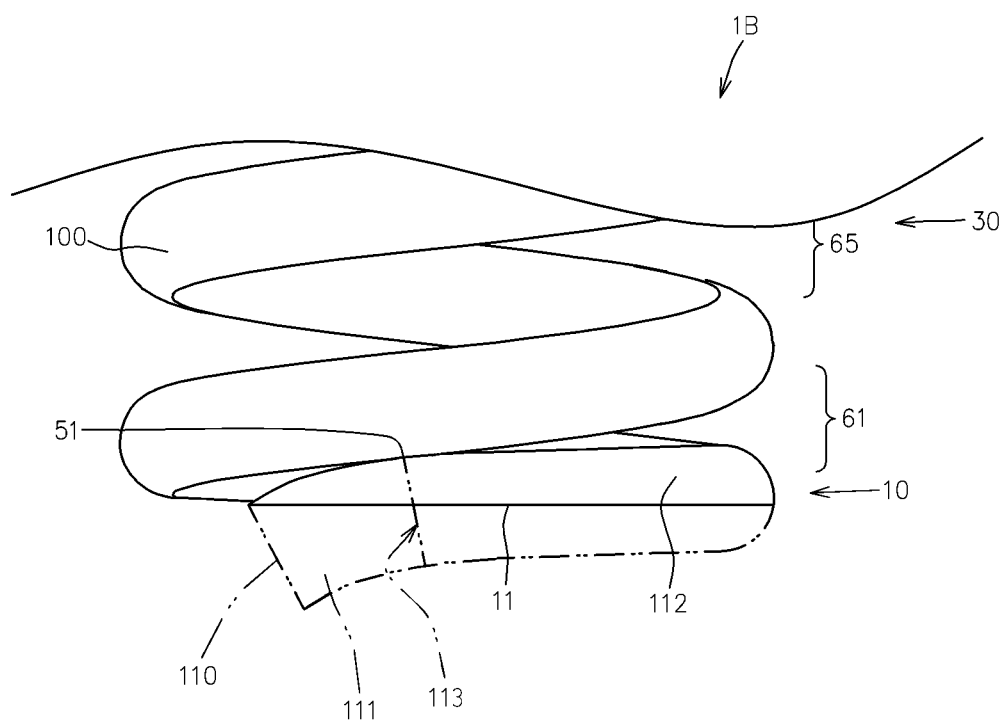
FIG. 9 is a partial front view of a coil spring according to a modification of the present invention.

FIG. 9 shows a partial front view of a modification 1B wherein a region of the first end coil part 10, which is located more toward the end side than the first reference point 51 is, is bent toward one side in the axial direction.

As shown in FIG. 9, in the modification 1B, the first end coil part 10 includes a first end coil part edge region 111 extending from a first end 110 on one side in the longitudinal direction of the spring wire 100 to a part that forms the first reference point 51, and a first end coil part transitional region 112 extending from the first end coil edge region 111 to the central coil part 30.

The first end coil part edge region 111 is bent toward one side in the axial direction of the coil spring 1B as compared with the first end coil part transitional region 112, and the first bearing surface 11 is formed so as to cross the border 113 shared with the first end coil part transitional region 112 from the first end coil part edge region 111 and reach the first end coil part transitional region 112.

The modification 1B having this configuration makes it possible to provide a thick first end coil part 10 while ensuring the flatness of the first bearing surface 11 by sufficiently securing the amount by which the first bearing surface 11 can be polished, and thus makes it possible to further reduce production of lateral force during compressional operation.

Naturally, the same configuration is also applicable to the second end coil part 20.

That is to say, it is possible that the second end coil part 20 includes a second end coil part edge region (not shown) extending from a second end 120 on the other side in the longitudinal direction of the spring wire 100 to a part that forms the second reference point 52, and a second end coil part transitional region (not shown) extending from the second end coil edge region to the central coil part 30, and that the second end coil part edge region is bent toward the other side in the axial direction of the coil spring 1 as compared with the second end coil part transitional region, and the second bearing surface 21 is formed so as to cross the border shared with the second end coil part transitional region from the second end coil part edge region and reach the second end coil part transitional region.

DESCRIPTION OF THE REFERENCE NUMERALS 1A, 1B Coil spring
10 First end coil part
11 First bearing surface
20 Second end coil part 21 Second bearing surface
30 Central coil part
51 First reference point
52 Second reference point
61 First end region
61a First end outer part
61b First end inner part
62 Second end region
62a Second end outer part
62b Second end inner part
63(1), 64(1) First transitional region
63(2), 64(2) Second transitional region
65 Reference region
100 Spring wire
110 First end of spring wire
111 First end coil edge region
112 First end coil part transitional region

The invention claimed is:

1. A coil spring, comprising:
a plurality of coil portions defining a helical space, wherein each coil portion is a full turn;
a first end region of the helical space disposed adjacent to a first end of the coil spring;
a second end region of the helical space disposed adjacent to a second end of the coil spring and opposite the first end region; and
a reference region of the helical space disposed between the first end region and the second end region and along an axial direction of the coil spring,
wherein, in a natural length state, a space between adjacent coil portions after one full turn and within the reference region is equal to a reference pitch value L throughout the entire reference region, where L is greater than zero,
wherein the first end region comprises:
a first end outer part that extends from a first reference point, where adjacent coil portions abut each other in the natural length state, for m number of turns of the helical space, where 0<m<1, and
a first end inner part that extends from the first end outer part for n number of turns of the helical space, where 0<n<1 and (m+n)<1,
wherein the first end outer part has a first variable pitch angle Pa,
wherein the first end inner part has a second variable pitch angle Pb greater than or equal to the first variable pitch angle Pa,
wherein a rate of change of the first variable pitch angle Pa is constant and the rate of change of the first variable pitch angle Pa is such that it would result in the reference pitch value L after one full turn starting from the first reference point, and
wherein a rate of change of the second variable pitch angle Pb is constant and greater than the rate of change of the first variable pitch angle Pa.

2. The coil spring according to claim 1, wherein the second end region comprises:
a second end outer part for the m number of turns of the helical space, and
a second end inner part that extends from the second end outer part for the n number of turns of the helical space,
wherein the second end outer part has the first variable pitch angle Pa, and
wherein the second end inner part has the second variable pitch angle Pb.

3. The coil spring according to claim 2, wherein the space between adjacent coil portions at inner end positions in the axial direction of the first and second end inner parts is equal to the reference pitch value L, and
wherein a first side and a second side in the axial direction of the reference region are connected to the inner end positions in the axial direction of the first and second end inner parts, respectively.

4. The coil spring according to claim 2, wherein the space between adjacent coil portions at inner end positions in the axial direction of the first and second end inner parts is greater than the reference pitch value L,
wherein the helical space further includes a first transitional region positioned between the inner end position of the first end inner part and a first side of the reference region in the axial direction,
wherein the space between adjacent coil portions within the first transitional region decreases in the axial direction from the inner end position of the first end inner part along the helical shape of the helical space toward the first side of the reference region and becomes the reference pitch value L,
wherein the helical space further includes a second transitional region positioned between the inner end position of the second end inner part and a second side of the reference region in the axial direction, and
wherein the space between adjacent coil portions within the second transitional region decreases in the axial direction from the inner end position of the second end inner part along the helical shape of the helical space toward the second side of the reference region and becomes the reference pitch value L.

5. The coil spring according to claim 1, further comprising:
a first end coil part having a first bearing surface arranged on an outer side of the first end of the coil spring;
a second end coil part having a second bearing surface arranged on an outer side of the second end of the coil spring;
a central coil part disposed between the first and second end coil parts,
wherein the first end coil part includes a first end coil part edge region extending from the first end on a first side of the coil spring in a longitudinal direction to a part forming the first reference point of the first end region, and a first end coil part transitional region extending from the first end coil edge region to the central coil part,
wherein the first end coil part edge region is bent toward one side of the coil spring in the axial direction as compared with the first end coil part transitional region, and
wherein the first bearing surface extends from the first end coil part edge region to the first end coil part transitional region across a border between the first end coil part edge region and the first end coil part transitional region.

6. The coil spring according to claim 5, wherein the second end coil part includes a second end coil part edge region extending from the second end on a second side of the coil spring in the longitudinal direction to a part forming a second reference point, where adjacent coil portions abut each other in the natural length state, of the second end region, and a second end coil part transitional region extending from the second end coil edge region to the central coil part, wherein the second end coil part edge region is bent toward another side of the coil spring in the axial direction as compared with the second end coil part transitional region, and wherein the second bearing surface extends from the second end coil part edge region to the second end coil part transitional region across a border between the second end coil part edge region and the second end coil part transitional region.

7. The coil spring according to claim 1, wherein a number of turns of the helical space from the first reference point of the first end region to a second reference point where adjacent coil portions abut each other in the natural length state, of the second end region is an integer multiple.

8. A coil spring, comprising:
a plurality of coil portions defining a helical space, wherein each coil portion is a full turn;
a first end region of the helical space disposed adjacent to a first end of the coil spring;
a second end region of the helical space disposed adjacent to a second end of the coil spring and opposite the first end region; and
a reference region of the helical space disposed between the first end region and the second end region,
wherein, in a natural length state, a space between adjacent coil portions after one full turn and within the reference region is equal to a reference pitch value L throughout the entire reference region, where L is greater than zero,
wherein the first end region extends from a first reference point, where adjacent coil portions abut each other in the natural length state, for m number of turns of the helical space, where $0<m<1$,
wherein the first end region has a variable pitch angle,
wherein a rate of change of the variable pitch angle of the first end region is constant and positive,
wherein the first end of the coil spring includes a first end coil part edge region and a first end coil part transitional region,
wherein the first end coil part edge region extends from the first end on a first side of the coil spring in a longitudinal direction to a part forming the first reference point of the first end region,
wherein the first end coil part transitional region extends from the first end coil part edge region to a central coil part of the coil spring,
wherein the first end coil part edge region is bent toward one side in an axial direction of the coil spring as compared with the first end coil part transitional region, and
wherein a first bearing surface arranged on an outer side of the first end of the coil spring extends from the first end coil part edge region to the first end coil part transitional region across a border between the first end coil part edge region and the first end coil part transitional region.

9. The coil spring according to claim 8, wherein the second end region extends from a second reference point, where adjacent coil portions abut each other in the natural length state, for the m number of turns of the helical space,
wherein the second end region has the variable pitch angle of the first end region,
wherein a rate of change of the variable pitch angle of the second end region is constant and positive.

10. The coil spring according to claim 9, wherein the spaces between adjacent coil portions at inner end positions in the axial direction of the first and second end regions are equal to the reference pitch value L, and
wherein a first side and a second side in the axial direction of the reference region are connected to the inner end positions in the axial direction of the first and second end regions, respectively.

11. The coil spring according to claim 9, wherein the spaces between adjacent coil portions at inner end positions in the axial direction of the first and second end regions are greater than the reference pitch value L,
wherein the helical space further includes a first transitional region positioned between the inner end position of the first end region and a first side of the reference region in the axial direction,
wherein the space between adjacent coil portions within the first transitional region decreases in the axial direction from the inner end position of the first end region along the helical shape of the helical space toward the first side of the reference region and becomes the reference pitch value L,
wherein the helical space further includes a second transitional region positioned between the inner end position of the second end region and a second side of the reference region in the axial direction, and
wherein the space between adjacent coil portions within the second transitional region decreases in the axial direction from the inner end position of the second end region along the helical shape of the helical space toward the second side of the reference region and becomes the reference pitch value L.

12. A coil spring, comprising:
a plurality of coil portions defining a helical space, wherein each coil portion is a full turn;
a first end region of the helical space disposed at a first end of the coil spring;
a second end region of the helical space disposed at a second end of the coil spring and opposite the first end region; and
a reference region of the helical space disposed between the first end region and the second end region,
wherein, in a natural length state, a space between adjacent coil portions after one full turn and within the reference region is equal to a reference pitch value L throughout the entire reference region, where L is greater than zero,
wherein the first end region comprises:
a first end outer part that extends from a first reference point, where adjacent coil portions abut each other in the natural length state, for m number of turns of the helical space, where $0<m<1$, and
a first end inner part that extends from the first end outer part for n number of turns of the helical space, where $0<n<1$ and $(m+n)<1$,
wherein the first end outer part has a first variable pitch angle Pa and the first end inner part has a second variable pitch angle Pb,
wherein a rate of change of the first variable pitch angle Pa is constant,
wherein a rate of change of the second variable pitch angle Pb is constant and greater than the rate of change of the first variable pitch angle Pa, and
wherein the first end inner part extends to the reference region.

* * * * *

UNITED STATES PATENT AND TRADEMARK OFFICE
CERTIFICATE OF CORRECTION

Page 1 of 1

PATENT NO. : 11,131,356 B2
APPLICATION NO. : 16/093511
DATED : September 28, 2021
INVENTOR(S) : Kishihara et al.

It is certified that error appears in the above-identified patent and that said Letters Patent is hereby corrected as shown below:

In the Claims

In Column 13, Claim 7, Line 12, delete "point" and insert -- point, --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*